(12) United States Patent
Keely et al.

(10) Patent No.: US 7,350,011 B2
(45) Date of Patent: Mar. 25, 2008

(54) MOBILE DEVICE EXPANSION SYSTEM

(75) Inventors: Leroy B. Keely, Portola Valley, CA (US); Matthew R. Lerner, Seattle, WA (US); Seiya Ohta, Issaquah, WA (US); John Stoddard, Lomond, CA (US); Jon LeFors, San Francisco, CA (US); Michael Nuttall, Portola Valley, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/609,190

(22) Filed: Dec. 11, 2006

(65) Prior Publication Data
US 2007/0083691 A1 Apr. 12, 2007

Related U.S. Application Data

(63) Continuation of application No. 11/060,353, filed on Feb. 18, 2005, now Pat. No. 7,200,702.

(51) Int. Cl.
*G06F 13/00* (2006.01)
(52) U.S. Cl. .................................. 710/303; 361/683
(58) Field of Classification Search ............... 707/303, 707/304; 361/683, 685, 686, 725, 726
See application file for complete search history.

(56) References Cited

U.S. PATENT DOCUMENTS

| | | | | |
|---|---|---|---|---|
| 5,889,964 A * | 3/1999 | Cho et al. | ................... | 710/304 |
| 5,987,545 A * | 11/1999 | Oh | .............................. | 710/100 |
| 6,118,663 A * | 9/2000 | Fan | .............................. | 361/725 |
| 6,195,718 B1 * | 2/2001 | Hennessy et al. | ........... | 710/304 |
| 6,246,575 B1 * | 6/2001 | Barrus et al. | ................ | 361/686 |
| 6,374,148 B1 * | 4/2002 | Dharmarajan et al. | ........ | 700/94 |
| 6,504,710 B2 * | 1/2003 | Sutton et al. | ................ | 361/686 |
| 6,724,623 B2 * | 4/2004 | Bovio et al. | ................. | 361/686 |
| 6,772,265 B2 * | 8/2004 | Baweja et al. | .............. | 710/303 |
| 7,209,124 B2 * | 4/2007 | Hunt et al. | .................. | 345/173 |
| 2004/0066620 A1 * | 4/2004 | Grunow et al. | ............. | 361/686 |
| 2005/0272471 A1 * | 12/2005 | Sherman | ..................... | 455/561 |
| 2006/0212637 A1 * | 9/2006 | Lo et al. | ...................... | 710/303 |

* cited by examiner

*Primary Examiner*—Glenn A. Auve
(74) *Attorney, Agent, or Firm*—Birch, Stewart, Kolasch & Birch, LLP

(57) ABSTRACT

An expansion device is provided for expanding the functionality of a mobile electronic device while in a mobile mode and/or in a desktop mode. The expansion device may be a media slice that provides multimedia functionality to a mobile electronic device. The media slice may be configured to receive an electromechanical interface from the mobile electronic device and to replicate the electromechanical interface for connecting to another expansion device, such as to a docking station or a port replicator. The expansion device and the mobile electronic device may be connected via a latch mechanism that easily couples and de-couples the devices. An expansion system is also provided that includes a support stand for providing orientation and support features for a computing device and/or an expansion device.

5 Claims, 15 Drawing Sheets

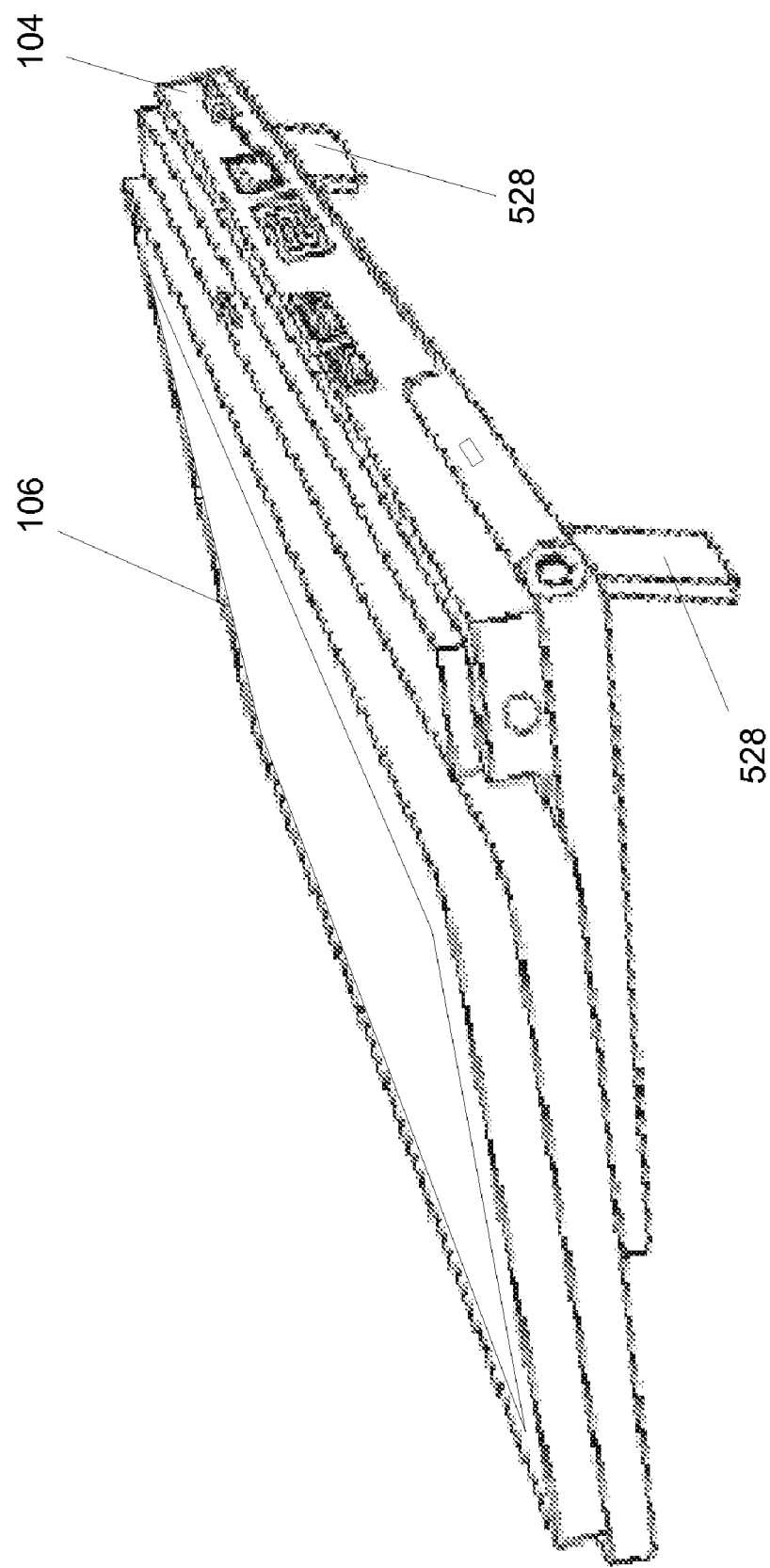

MOBILE DEVICE EXPANSION SYSTEM

CROSS REFERENCE TO RELATED APPLICATIONS

This application is a continuation of U.S. patent application Ser. No. 11/060,353, filed Feb. 18, 2005, now U.S. Pat. No. 7,200,702 entitled "Mobile Device Expansion System" and incorporated herein by reference.

FIELD OF THE INVENTION

The present invention relates to a computer expansion system. More specifically, the present invention relates to an expansion device for interfacing with a mobile electronic device to expand the functionality and/or connectivity of the mobile electronic device.

DESCRIPTION OF RELATED ART

Mobile electronic devices are becoming increasingly thin and light, which can improve their mobility and extend their battery life. However, these mobile devices often sacrifice functionality, such as optical drives and multimedia devices (e.g., speakers), to improve their mobility characteristics. Such mobile devices can be connected to individual peripheral devices to expand their functionality as desired, but this can be inconvenient or cumbersome when connecting multiple devices. They can also be connected to docking stations and port replicators to provide expanded functionality while in a desktop mode.

Conventional docking stations and port replicators permit mobile devices to be quickly converted into stationary, desktop workstations via simple connections to peripheral devices. When the mobile device is attached to the docking station or port replicator, the mobile device accesses the peripheral devices connected to the docking station or port replicator, which increases its functionality for use in desktop mode. The mobile device quickly connects to the docking station or port replicator via a connector port, such as a universal serial bus connector or a small computer systems interface connector.

Conventional docking stations connect to a keyboard, a mouse, a network card and a power supply. Some docking stations also provide slots for expansion cards, furnish bays for optical drives and hard drives, include multimedia speakers, and/or offer connectivity to an external monitor. Further, some docking stations include a stand for supporting an external monitor. Conventional port replicators are similar to docking stations in that they permit peripheral devices to be attached to the mobile device to convert it to a desktop workstation. However, port replicators tend to be smaller than docking stations and are not as readily expandable as a docking station. Further, port replicators do not include a monitor stand, expansion cards, supply bays for optical drives and hard drives, or multimedia speakers.

Users of conventional mobile computing devices have the option of limited functionality of the device while in a mobile mode, the option of connecting individual devices to the mobile device for expanding specific functionality as desired, or the option of using a port replicator or docking station to connect multiple devices thereto while in a desktop mode.

BRIEF SUMMARY

The present invention provides an expansion device for quickly expanding the functionality of a mobile electronic device while in a mobile mode and/or in a desktop mode.

Aspects of the invention include an expansion device that receives an electro-mechanical interface from the mobile electronic device, and that replicates the electro-mechanical interface for connecting the expansion device to another expansion device. In one embodiment, the expansion device is a media slice that provides multimedia functionality to a mobile electronic device. The media slice may be configured to receive an electromechanical interface from the mobile electronic device and to replicate the electromechanical interface of the mobile device for connecting to another expansion device, such as to a docking station or to a port replicator.

Various aspects of the invention include an interface system for connecting the mobile electronic device to a first expansion device, and for connecting the first expansion device to the second expansion device. The expansion devices and the mobile electronic device may be connected via a latch mechanism that couples and de-couples respective device and indicates the connected status of the expansion device. Additional aspects of the invention may include orientation and support features for an expansion device.

In other aspects, computer-executable instructions for implementing the disclosed methods are stored on computer-readable media. These and other aspects are addressed in relation to the figures and related description.

BRIEF DESCRIPTION OF THE DRAWINGS

FIG. 6 shows the PC of FIG. 1 in the process of being connected to the media slice of FIG. 1.

DETAILED DESCRIPTION

Figure 1:
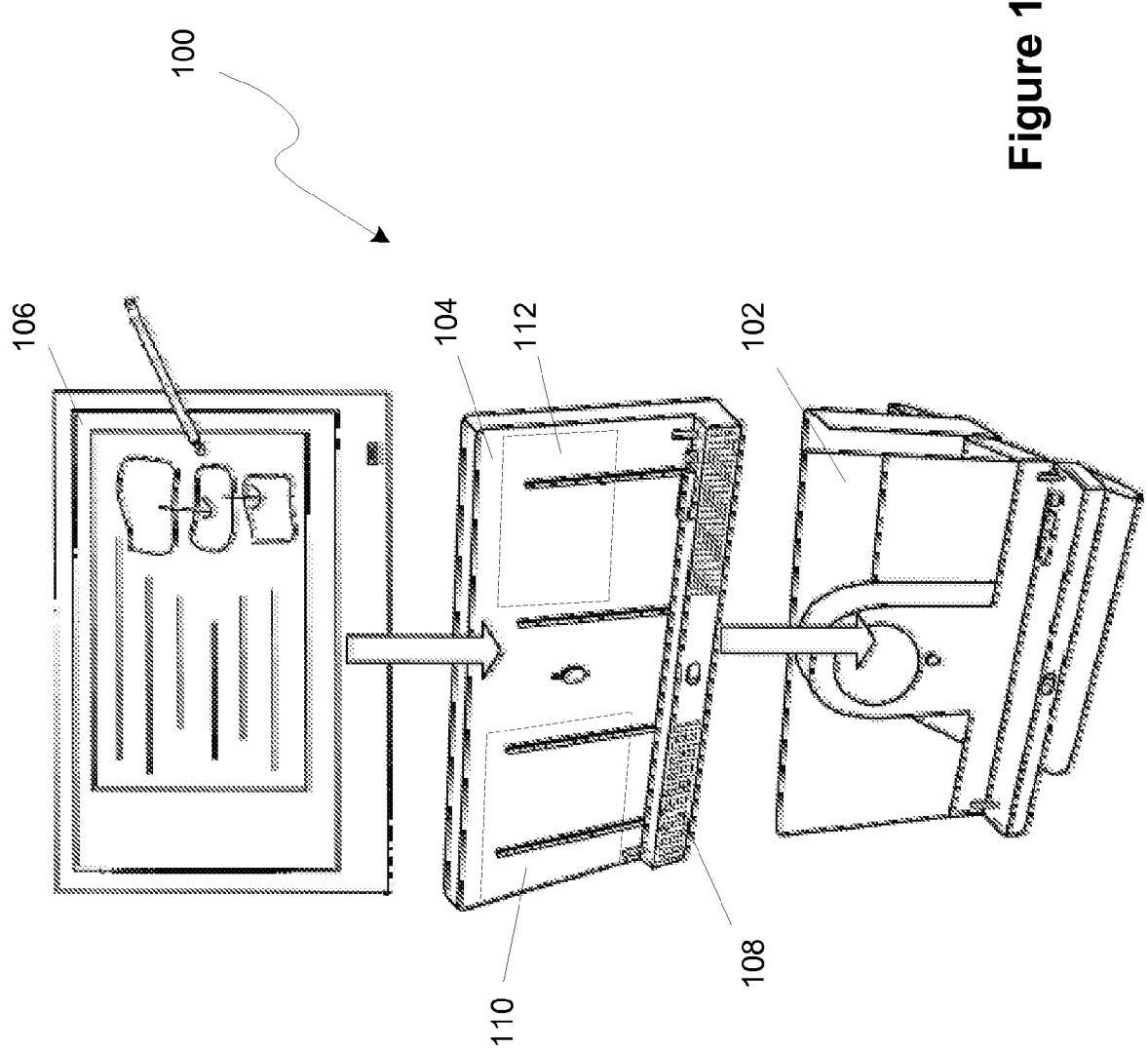
FIG. 1 illustrates connections for a mobile device expansion system according to an embodiment of the present invention, which includes a general-purpose PC, a media slice, and a PC stand.
Figure 2:
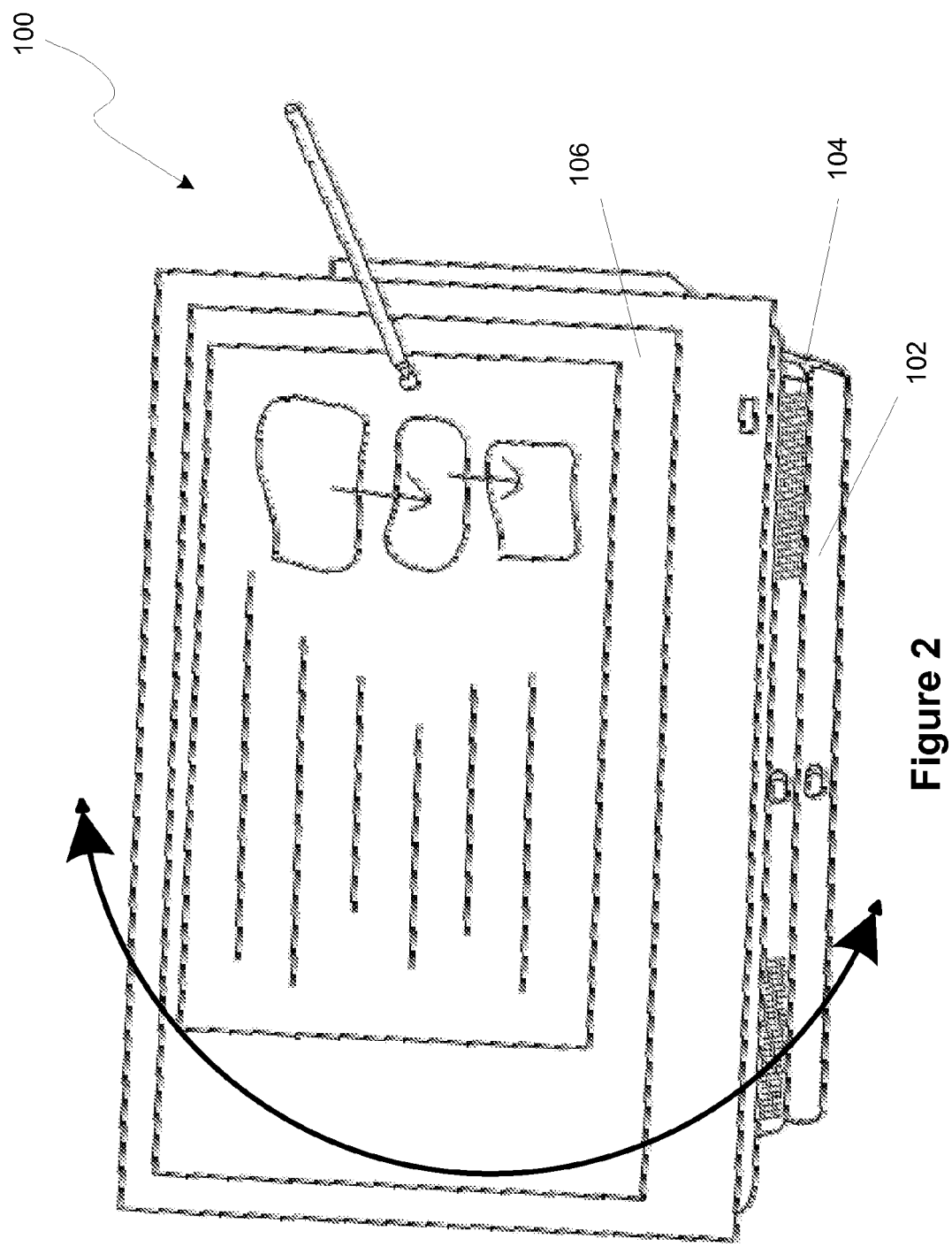
FIG. 2 shows the PC, the media slice and the PC stand of FIG. 1 in a connected mode with the PC in a landscape orientation.

FIGS. 1 and 2 show a computing device expansion system 100 according to an embodiment of the invention, which generally includes a PC stand 102, an expansion device 104 and a computing device 106. Expansion device 104 interfaces with computing device 106 to expand the functionality of the computing device. For instance, computing device 106 may be an ultra-lightweight mobile computer that does not include multimedia hardware (e.g., an optical drive and speakers). Expansion device 104 is configured to provide multimedia hardware to the computing device, as desired, in both a portable and a desktop configuration without affecting its connectivity to PC stand 102, such as to a docking station.

The computing device may be a mobile PC, such as tablet PC 106 shown in FIG. 1. However, aspects of the invention may be applicable for a variety of computing devices, such as a laptop PC, a personal digital assistant, a mobile terminal, etc. In addition, the expansion device can be a device that provides various types of expanded functionality.

As an example, the expansion device may be a media slice 104 as shown in FIG. 1 that includes multimedia speakers 108, an optical drive 110 such as a DVD player, and an extra battery 112 for providing extended power to the system. The PC stand may be a docking station 102 that permits the PC to connect quickly with peripheral devices (not shown) coupled to the docking station, such as a power supply, a keyboard, a mouse and a network interface, which provide desktop functionality to the PC when connected thereto. However, the PC stand may simply be a powered or non-powered support for the PC that include very little expanded functionality or none at all.

PC 106 is configured to interface with media slice 104 using a connector, such as a small computer systems interface (SCSI) connector, a universal serial bus (USB) port, a serial port, a parallel port, a peripheral component interconnect (PCI) connector, a PCI express connector, an industry standard architecture (ISA) bus connector, a wireless transmitter/receiver and/or another type of connector. Similarly, media slice 104 is configured to interface with stand 102 via the same type connector; although it may interface with the stand using a different type of connector. In the example shown in FIG. 1, PC 106, media slice 104 and stand 102 are configured to be electromechanically connected together in a daisy chain (serial) configuration. A daisy chain connection can permit a plurality of expansion devices (not shown) to be included in a serial connection from PC 106 to stand 102. Thus, media slice 104 is shown in FIG. 2 as being integrally connected between PC 106 and stand 102. The addition of media slice 104 or other expansion devices permits specialized, expanded functionality as desired by the user in either a mobile mode or a desktop mode.

PC 106 in the present example is a thin, lightweight tablet PC that does not include multimedia speakers or an optical drive. The lack of these devices may improve the mobility, weight, and battery longevity characteristics of the tablet PC. However, it may be desirable for the user of the tablet PC to have expanded multimedia functionality on the tablet PC as needed. For instance, it may be desirable for the user to watch a DVD on the tablet PC while traveling with it in a portable mode, but otherwise to exclude this functionality and its mobility disadvantages from the tablet PC. The expanded functionality may be provided by connecting the PC 106 to media slice 104. After watching the movie, the user can remove the media slice to reduce weight and/or to improve portability of the PC when the expanded functionality is not needed.

In another example, media slice 104 can provide expanded functionality to a desktop configuration of the PC in addition to that provided by docking station 102. In such a configuration, media slice 104 connects to PC 106 via an expansion connector, such as a SCSI connector of the PC. The media slice preferably replicates the expansion connector of the PC for connecting the PC/media slice combination to the docking station in a daisy chain fashion. However, the media slice could also interface with the PC using a different type of interface than that the interface between the media slice and the stand. Use of a common type of interface between these devices, though, simplifies connections and readily provides for daisy chain connections between multiple devices.

Figure 3:
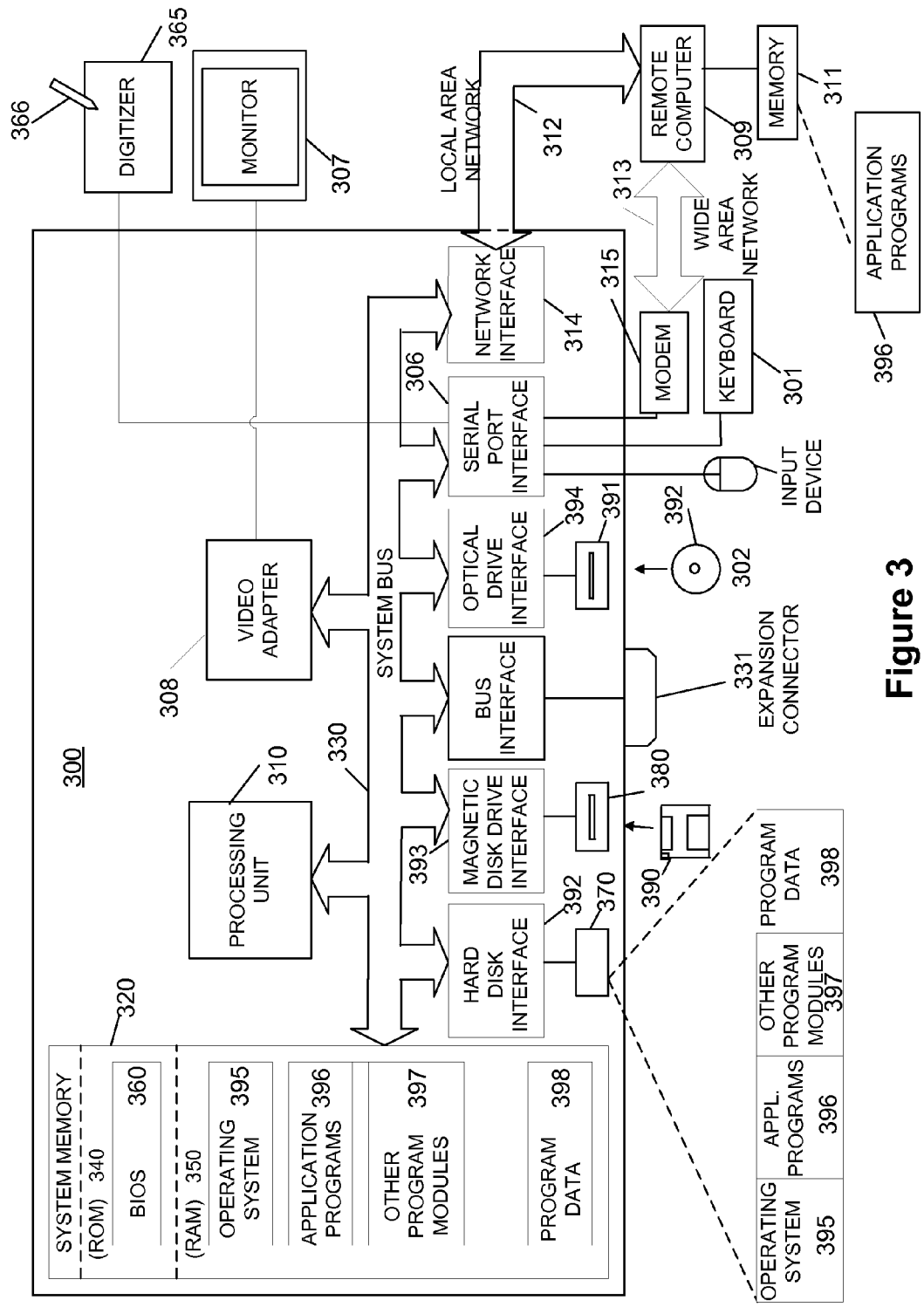
FIG. 3 is a functional diagram of the general-purpose PC of FIG. 1.

FIG. 3 illustrates a schematic diagram of an illustrative conventional general-purpose digital computing environment for a computer 300, such as tablet PC 106, which can be used to implement various aspects of the present invention. As shown in FIG. 3, computer 300 includes a processing unit 310, a system memory 320, and a system bus 330 that couples various system components including the system memory to the processing unit 3 10. The system bus 330 may be any of several types of bus structures including a memory bus or memory controller, a peripheral bus, and a local bus using any of a variety of bus architectures. The system memory 320 includes read only memory (ROM) 340 and random access memory (RAM) 350.

A basic input/output system 360 (BIOS), containing the basic routines that help to transfer information between elements within the computer 300, such as during start-up, is stored in the ROM 340. The computer 300 also includes a hard disk drive 370 for reading from and writing to a hard disk (not shown). It could also include a magnetic disk drive 380 for reading from or writing to a removable magnetic disk 390, and an optical disk drive 391 for reading from or writing to a removable optical disk 392 such as a CD ROM or other optical media. The hard disk drive 370, magnetic disk drive 380, and optical disk drive 391 are connected to the system bus 330 by a hard disk drive interface 392, a magnetic disk drive interface 393, and an optical disk drive interface 394, respectively. The drives and their associated computer-readable media provide nonvolatile storage of computer readable instructions, data structures, program modules and other data for the personal computer 300. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 370, magnetic disk 390, optical disk 392, ROM 340 or RAM 350, including an operating system 395, one or more application programs 396, other program modules 397, and program data 398. A user can enter commands and information into the computer 300 through input devices such as a keyboard 301 and pointing device or other input device 302. Other input devices (not shown) may include a directional input device, a microphone, a joystick, a game pad, a satellite dish, scanner or the like.

These and other input devices are often connected to the processing unit 310 through a serial port interface 306 that is coupled to the system bus, but may be connected by other interfaces, such as a parallel port, a game port or a universal serial bus (USB). Further still, these devices may be coupled directly to the system bus 330 via an appropriate expansion connector 331, such as a SCSI connector, a PCI connector, a PCI express connector, or an ISA connector. In addition, an expansion connector 331 may be used for connecting to an expansion device, such as media slice 104, or to a plurality of expansion devices connected in a daisy chain configuration. A monitor 307 or other type of display device is also connected to the system bus 330 via an interface, such as a video adapter 308. In addition to the monitor, personal computers typically include other peripheral output devices (not shown), such as speakers and printers.

In one embodiment, a pen digitizer 365 and accompanying pen or stylus 366 are provided to digitally capture freehand input. Although the digitizer 365 is shown apart from the monitor 307, the usable input area of the digitizer 365 may be co-extensive with the display area of the monitor 307. Further still, the digitizer 365 may be integrated in the monitor 307, or may exist as a separate device overlaying or otherwise appended to the monitor 307.

The computer 300 can operate in a networked environment using logical connections to one or more remote computers, such as a remote computer 309. The remote computer 309 can be a server, a router, a network PC, a peer device or other common network node, and typically includes many or all of the elements described above relative to the computer 300, although only a memory storage device 311 has been illustrated in FIG. 3. The logical connections depicted in FIG. 3 include a local area network (LAN) 312 and a wide area network (WAN) 313. Such networking environments are commonplace in offices, enterprise-wide computer networks, intranets and the Internet.

When used in a LAN networking environment, the computer 300 is connected to the local network 312 through a network interface or adapter 314. When used in a WAN networking environment, the personal computer 300 typically includes a modem 315 or other means for establishing a communications over the wide area network 313, such as the Internet. The modem 315, which may be internal or external, is connected to the system bus 330 via the serial port interface 306. In a networked environment, program modules depicted relative to the personal computer 300, or portions thereof, may be stored in the remote memory storage device. Further, the system may include wired and/or wireless capabilities. For example, network interface 314 may include Bluetooth, SWLan, and/or IEEE 802.11 class of combination abilities. It is appreciated that other wireless communication protocols may be used in conjunction with these protocols or in place of these protocols.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 4A:
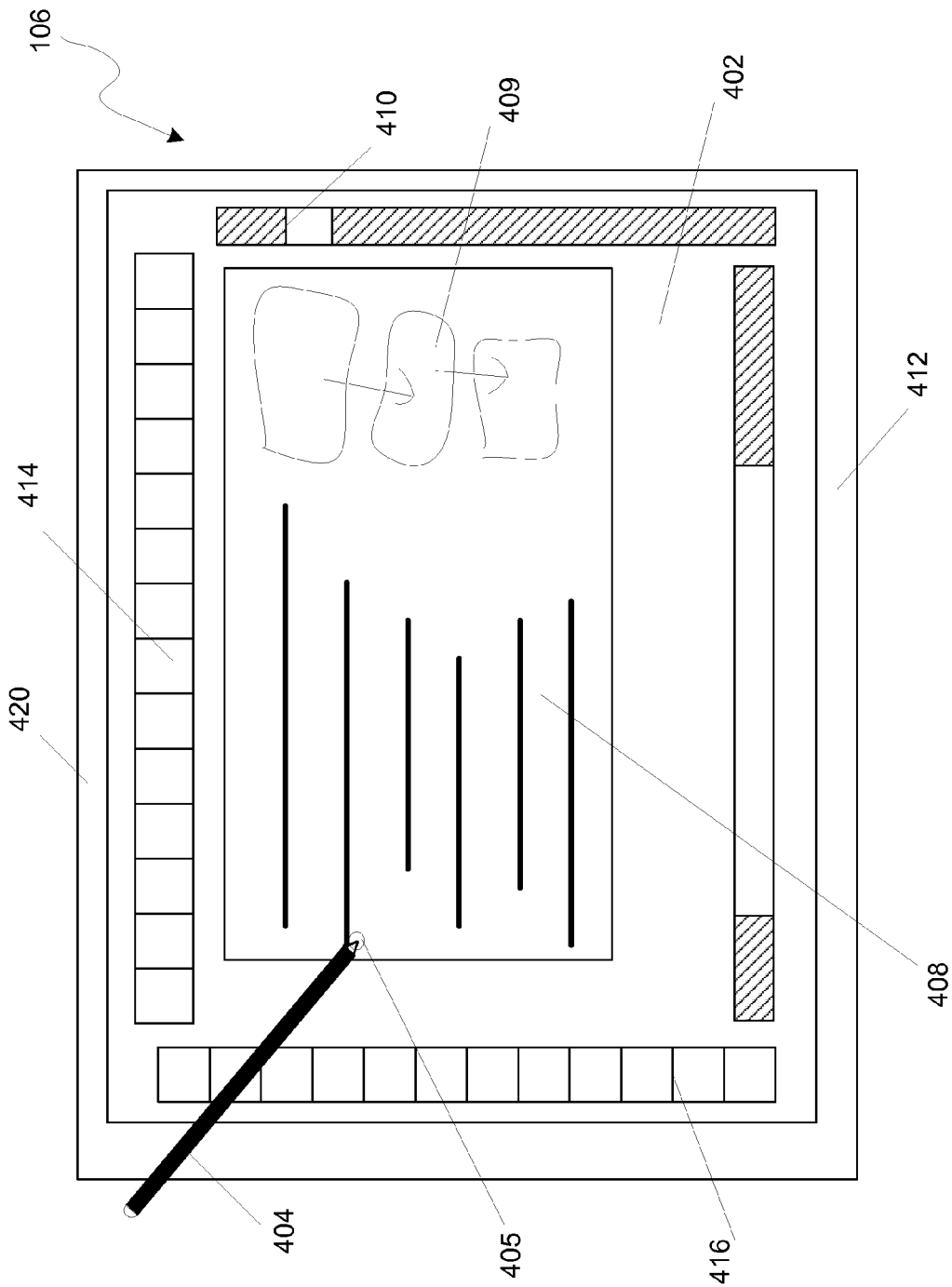
FIG. 4A is a front view of the PC of FIG. 1 shown as an example tablet PC.
Figure 4B:
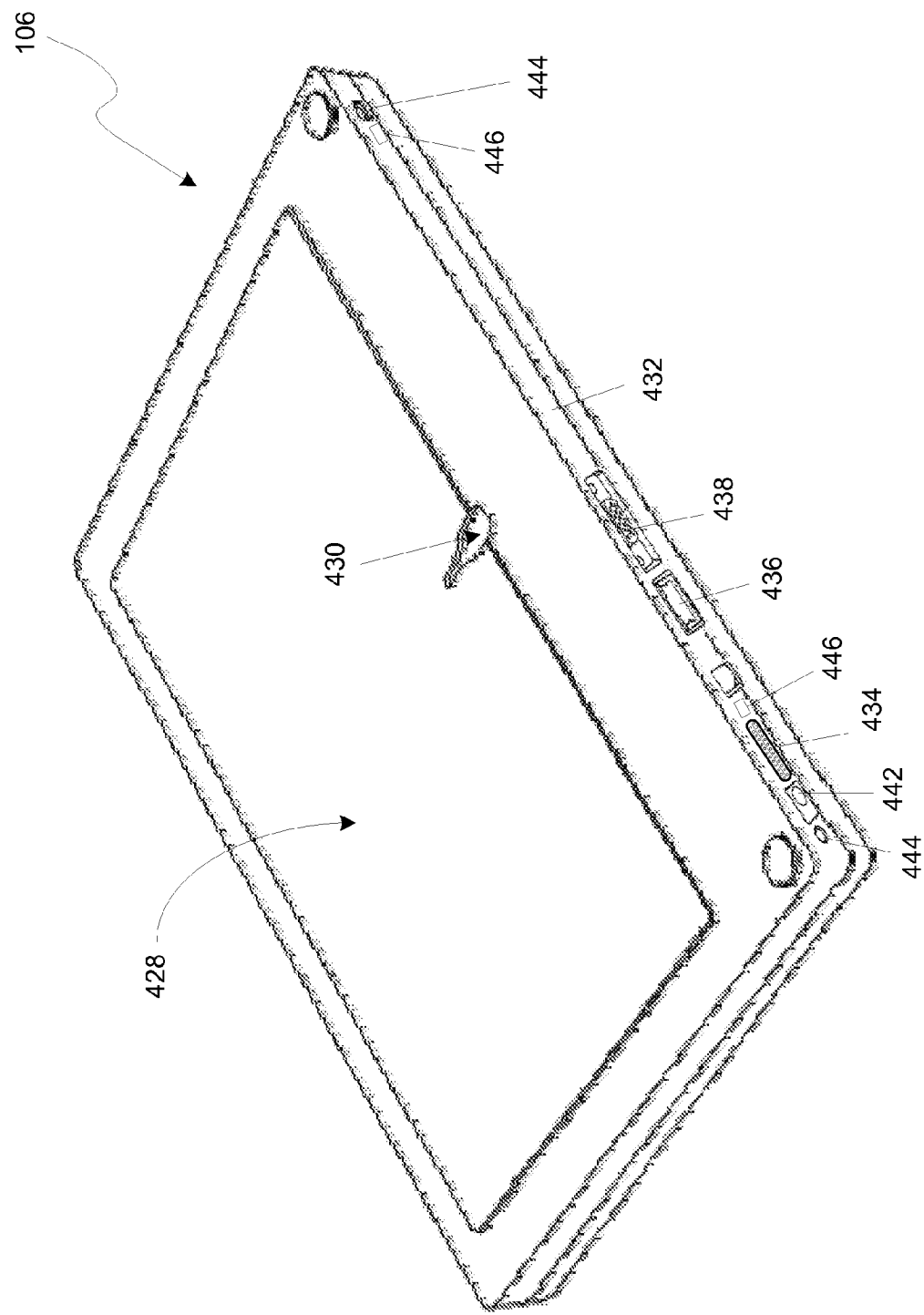
FIG. 4B is a bottom view of the tablet PC of FIG. 4A.

FIGS. 4A and 4B show an illustrative tablet PC 106 that can be used in accordance with various aspects of the present invention. Any or all of the features, subsystems, and functions in the system of FIG. 3 can be included in the computer of FIGS. 4A and 4B. As shown, tablet PC 106 includes a housing 420 and a large display surface 402, e.g., a digitizing flat panel display, preferably, a liquid crystal display (LCD) screen, on which a plurality of windows may be displayed. In the example shown in FIG. 4A, a single window is shown displaying a textual document 408 along with hand-drawn graphics 409, a vertical scroll bar 410, a horizontal scroll bar 412, a header menu 414, and a toolbar 416. Document 408 is shown being displayed in a landscape orientation; although other orientations are possible.

As shown in FIG. 4B, an underside 428 of tablet PC 106 includes a keyhole slot 430 for securing the PC to media slice 104, to PC stand 102, or to another expansion device. A rear portion 432 of PC 106 includes port connectors, such as a first expansion connector 434, a serial port 436, a video card connector 438, and a network interface connector 440. Rear portion 432 further includes a power supply interface 442 for receiving a power supply connection. In addition, rear portion 432 includes a pair of alignment slots 444 and latching holes 446 for use with aligning and retaining the PC in an interface connection with media slice 104, PC stand 102 or another expansion device.

First expansion connector 434 provides an electromechanical interface through which media slice 104, PC stand 102 or another expansion device can be simply and directly attached to it. Connector 434 may be a first part of a SCSI, PCI, PCI express, USB or other type of high-speed bus connection for connecting PC 106 to one or more peripheral devices that can expand functionality of the PC. Preferably, connector 434 is configured to permit hot swapping of devices connected thereto, as well as the connection of plug and play devices that do not need to be pre-installed on the PC. Although shown as a single connector, a plurality of connectors may also be used for interfacing with media slice 104 or other expansion devices. Further, PC 106 may optionally be configured to wirelessly connect to media slice 104, such as via a BLUETOOTH connection or a WLAN connection.

Figure 5A:
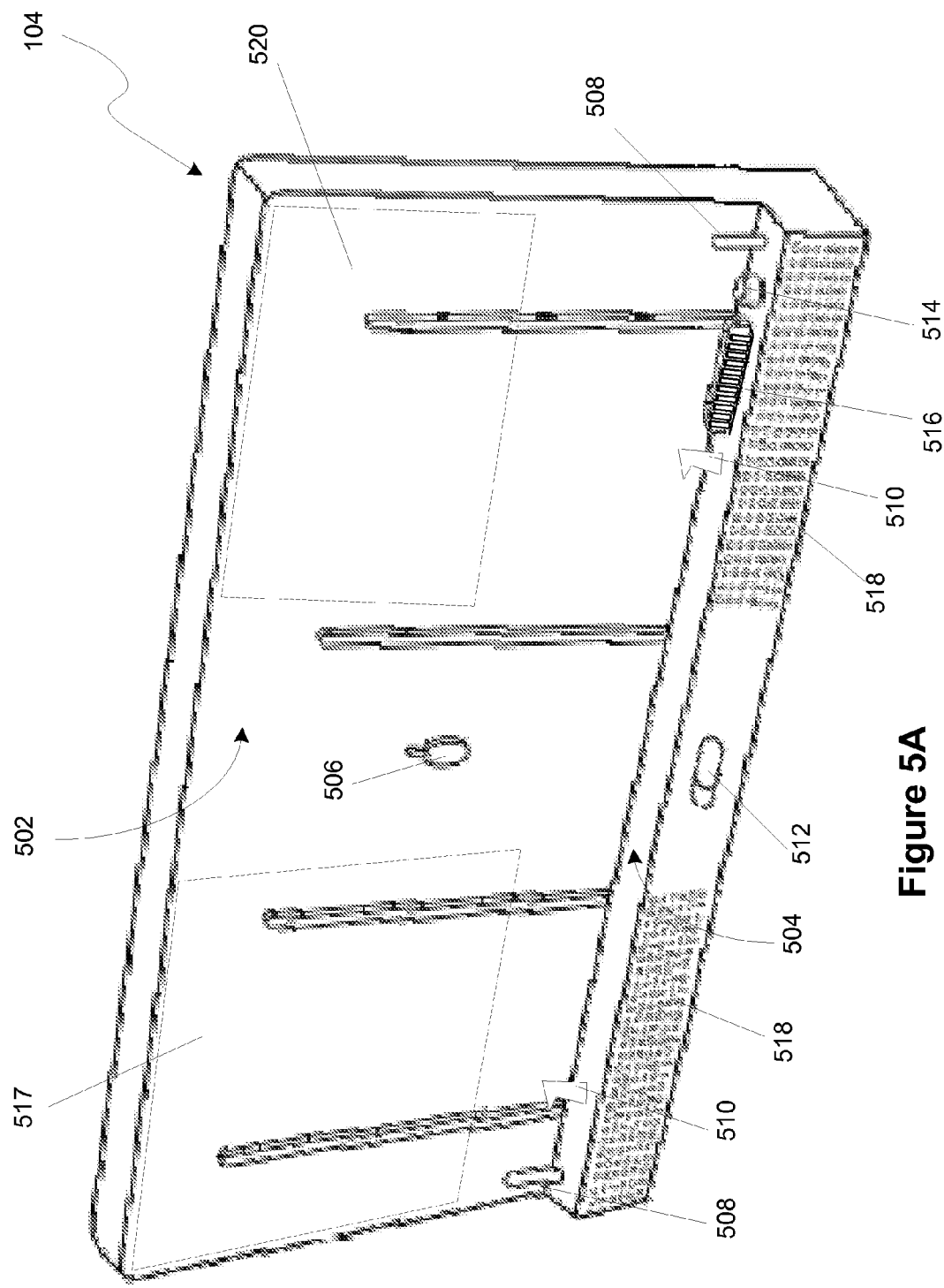
FIG. 5A is a front view of the media slice of FIG. 1.
Figure 5B:
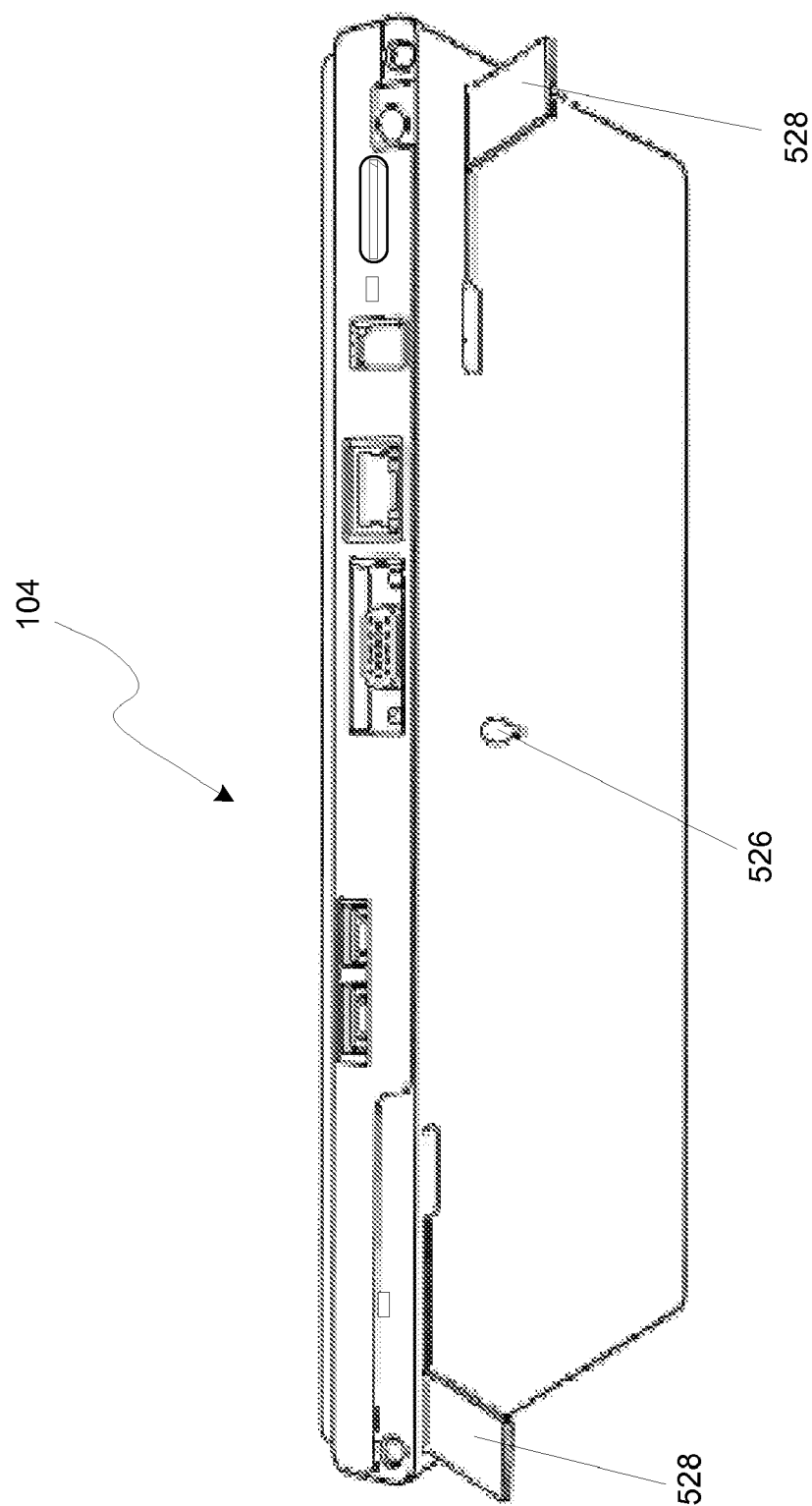
FIG. 5B is a rear view of the media slice of FIG. 1.
Figure 5C:
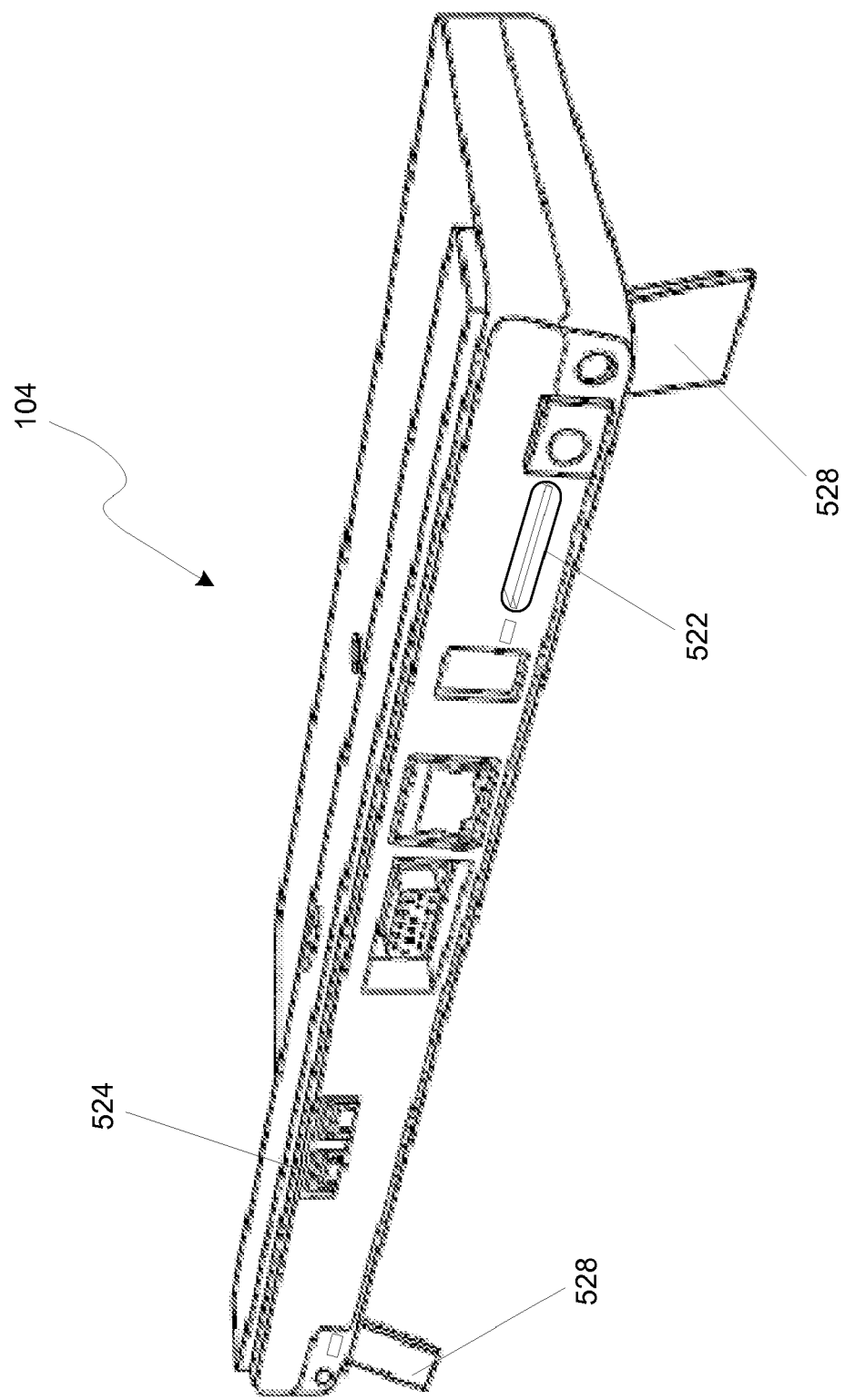
FIG. 5C is a rear, perspective view of the media slice of FIG. 1.

FIGS. 5A-5C show an illustrative media slice 104, which is an expansion device that can be used in accordance with aspects of the invention. As shown in FIG. 5A, media slice 104 includes a back 502 for supporting PC 106, a base 504 for connecting with an interface region of computing device (e.g., rear portion 432 of PC 106), a retention button 506, alignment pins 508, latches 510, Release button 512, power interface 514 and a second expansion connector 516. Retention button 506 is configured to be received by keyhole slot 430 on the underside of the PC and to be retained therein for preventing the PC from rotating away from the media slice in a connected state. Alignment pins 508 are received by alignment slots 444 of the PC for properly aligning the PC as it slides into engagement with the media slice. Latches 510 are hook latches are movable between an engaged position (e.g., toward the left as shown in FIG. 5A) for latching the PC to the media slice and disengaged position (e.g., toward the right as shown in FIG. 5A). Release button 512 is connected to the hook latches for moving between the engaged and disengaged positions, which permits a user to disengage the PC easily from the media slice. Power interface 514 connects with power supply interface 442 of the PC to provide power when the media slice and PC are connected. Second expansion connector 516 is configured to mate with first expansion connector 434 of the PC to expand its functionality. As such, connector 516 is the second part of the SCSI, PCI, PCI express, USB or other type of high-speed bus connection 434 of PC 106 that permits the PC to access the expanded functionality of the media slice.

Media slice additionally includes an integrated optical drive, such as CD/DVD player 517, a set of stereo speakers 518, and an optional auxiliary battery pack 520. These are merely example peripheral devices built into the media slice. It is understood that media slice 104 could be an expansion device that includes a wide variety of peripheral devices, which may or may not be specialized for particular functions. For instance, it could be an expansion device that includes a second hard drive, a backup storage system for periodic backups of a computing device, a set of extended life batteries, analog audio and video converters converting analog signals to digital signals and vice versa, etc.

In the present example, media slice 104 provides expanded multimedia functionality to PC 106 for playing compact disks (CDs) or digital video disks (DVDs) and for providing stereo audio output in association therewith. It also optionally provides a supplemental power supply from battery pack 520 to support the power requirements of the additional multimedia functionality. However, the additional functionality may also be powered by PC 106 through connector 516 and/or by an external power source to the media slice. The media slice can permit a user of the PC that lacks DVD player functionality to watch DVDs on the PC in a mobile or desktop mode as desired. By connecting the PC to the media slice when the expanded functionality is desired, the user can maintain the mobility and battery life advantages of the PC at other times. In other words, the user can have a lightweight, highly portable PC when desired, and can connect to the media slice to provide DVD playing functionality when such functionality is desired.

As shown in FIGS. 5B and 5C, media slice 104 generally replicates the connectors of PC 106 along its rear portion 432, which is covered by base 504 when it is connected to the media slice. This permits the media slice/PC unit to be connected to another expansion device, such as docking stand 102, a port replicator (not shown), or another media slice. As such, PC 106 can easily be attached in a serial, daisy chain configuration to several expansion devices. To assist simple connectivity between these devices, media slice 104 preferably includes a third expansion connector 522 that is the same type of connector as first expansion connector 434 on PC 106. This permits the same type of high-speed connection (e.g., a SCSI, PCI, PCI Express, or USB connection) used to connect the PC to the media slice to be continued to additional expansion devices. In other words, the media slice generally replicates the connection configuration and physical layout of connectors on the PC to which it attaches so that the PC/media slice unit may be further connected to another device in a like manner. In addition to replicating the PC's connection configuration, the media slice may also include supplemental connectors beyond those provided on the PC, such as additional USB ports 524 shown in FIG. 5C.

As shown in FIG. 5B, media slice 104 also includes a keyhole slot 526 on its underside, which permits it to attach to PC stand 102 or to another expansion device in the same way as the PC attaches to the media slice. As further shown, media slice 104 may also include features for enhancing use of the media slice/PC unit in apart from a stand or other device. For instance, the media slice may include foldout legs 528 for support the PC at a desirable viewing angle when the media slice/PC unit is placed on a substantially horizontal surface. FIG. 6 shows the PC/media slice unit in an angled mode of use provided by legs 528 and a front portion of the media slice. Such an angled configuration can improve viewability of the PC screen when playing a DVD or otherwise interacting with the PC.

Figure 7:
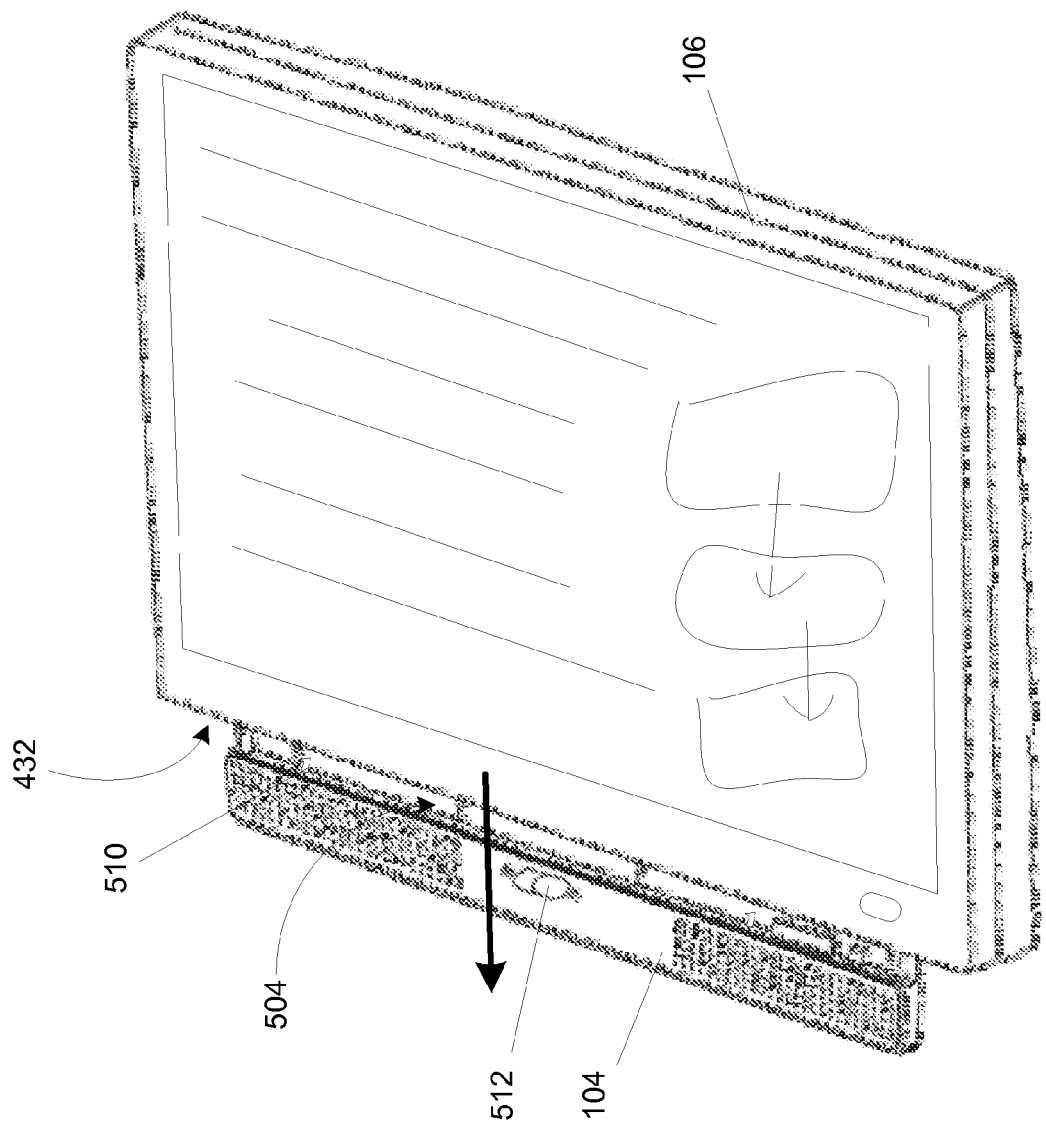
FIG. 7 is a perspective view of the PC and the media slice of FIG. 6 after being connected together.

As shown in FIG. 7, PC 106 can easily be connected to media slice 104 by horizontally sliding the PC such that alignment holes 444 slide along alignment posts 508 to move rear portion 432 to media slice base 504. Although not shown in FIG. 7, the PC is placed on the media slice such that button 506 (see FIG. 5A) of the media slice is received in keyhole slot 430 (see FIG. 4B) of the PC and the alignment posts align with the alignment holes. When rear portion 432 and base 504 move proximate to each other, latches 510 preferably snap into their engaged positions to retain the PC and media slice in a mated configuration. Thus, media slice may be automatically connected to the PC by simply sliding them together. The user can also easily disconnect the devices by simply moving the release button 512 from its engaged position to its disengaged position, which moves latches 510 connected thereto from their engaged positions to their disengaged positions, and sliding the PC apart from the media slice. The PC can be configured for hot swapping of the connection to the media slice. As such, simply sliding the release button 512 to its release position and moving the PC apart from the media slice will cause the PC to drop the logical connection with the media slice. Optionally, the media slice and PC may be configured such that moving the release button to its release position sends a signal to the PC to close the logical connection to the media slice. Thus, in the single step of moving the release button to its release position, the logical connection between the PC and the media slice can be closed so the electromechanical connection can then be safely unplugged.

Release button 512 provides the further advantage of easily identifying to the user the connection state of the PC with the media slice. If the release button is in its engaged position (to the left in FIG. 2), the user can quickly tell that the PC and media slice are properly mated. If it is in its disengaged position (to the right in FIG. 7), the user can quickly tell that the PC and media slice are functionally disconnected. Optionally, state indicators may be provided on the PC, media slice, and/or stand to indicate the connection state between respective devices. For instance, a light emitting diode (LED) may change colors depending on the connection state or different LEDs may indicate different connection states. Further, it is understood that other release mechanisms may be used, such as a dedicated release button, a soft key providing release functionality, or a software selectable option for releasing an electrical and/or physical connection between devices.

Figure 8:
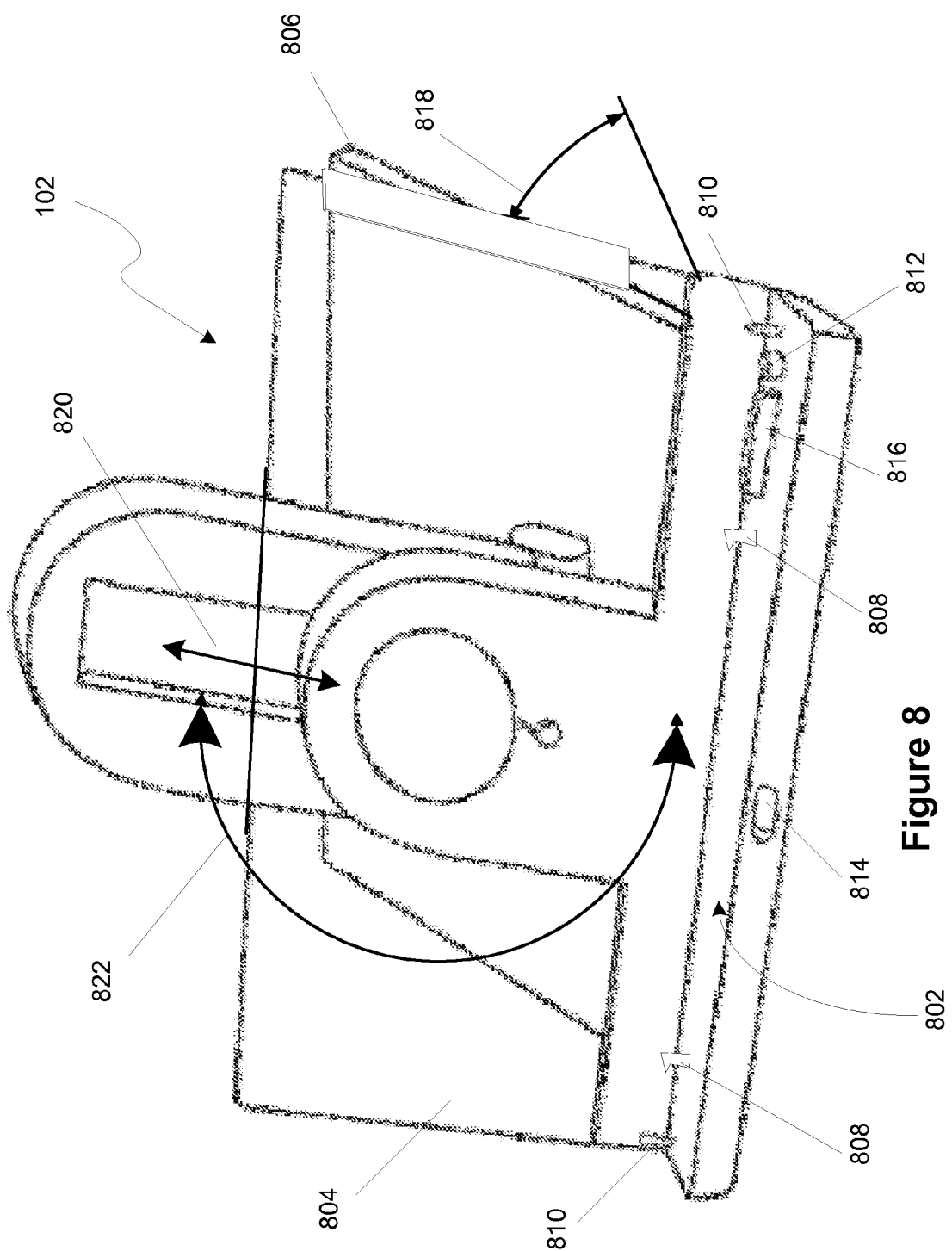
FIG. 8 shows the PC stand of FIG. 1.

FIG. 8 generally shows PC stand 102 apart from PC 106 and media slice 104. PC stand 102 is configured to support PC 106 at various orientations that may be desired by the user for viewing the PC, for interacting with it, and/or for writing and drawing on its interactive screen. The PC stand includes a base 802, a back 804 having an engagement button 805, and a pedestal 806. As with base portion 504 of the media slice, base 802 is configured to mate with rear portion 432 of PC 106 or the rear portion of the media slice. Similarly, the base includes latches 808, alignment posts 810, a power supply interface 812, a release button 814, and an expansion connector 816, which operate substantially the same as the corresponding features of the media slice. As such, PC 106 can mate with PC stand 102 by receiving button 805 into keyhole 430 and by permitting alignment holes 444 to slide along alignment posts 810 until latches 808 engage the PC.

As shown, PC stand 102 is configured to have a small shape relative to PC 106 such that it generally does not extend beyond the perimeter of the PC when mated thereto. Further, back 804 may be transparent to make the stand unobtrusive when empty. As shown, the stand has tilt adjustment in the direction of angle 818, height adjustment along slide 820, and orientation (rotation) adjustment in the direction of arc 822. The plurality of adjustments provides near/tilted positions, such as shown in FIG. 8, for easy writing on and/or viewing of the PC. They also provide far/raised positions, such as shown in FIG. 2, for tiling via the use of a second monitor. It further supports rotation between portrait and landscape orientations in both near/tilted and far/raised positions. It achieves low desktop obtrusiveness by having a main front surface, which is largely transparent, and by only coming forward of that surface on two of the PC's four edges along base portion 802.

Figure 9:
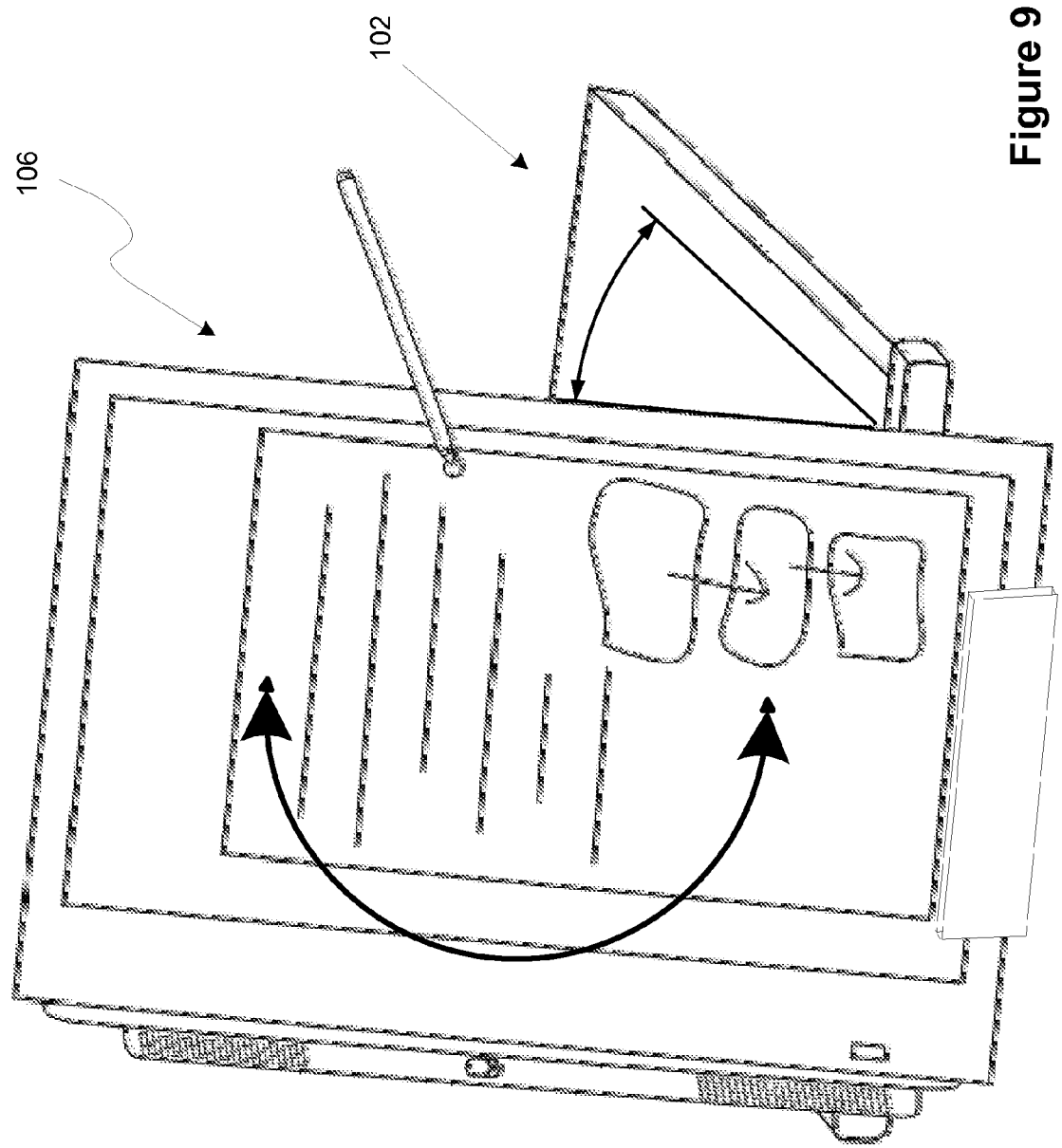
FIG. 9 shows the PC of FIG. 1 connected to the PC stand of FIG. 1 and disposed in a portrait orientation without the PC being connected to the media slice.
Figure 10:
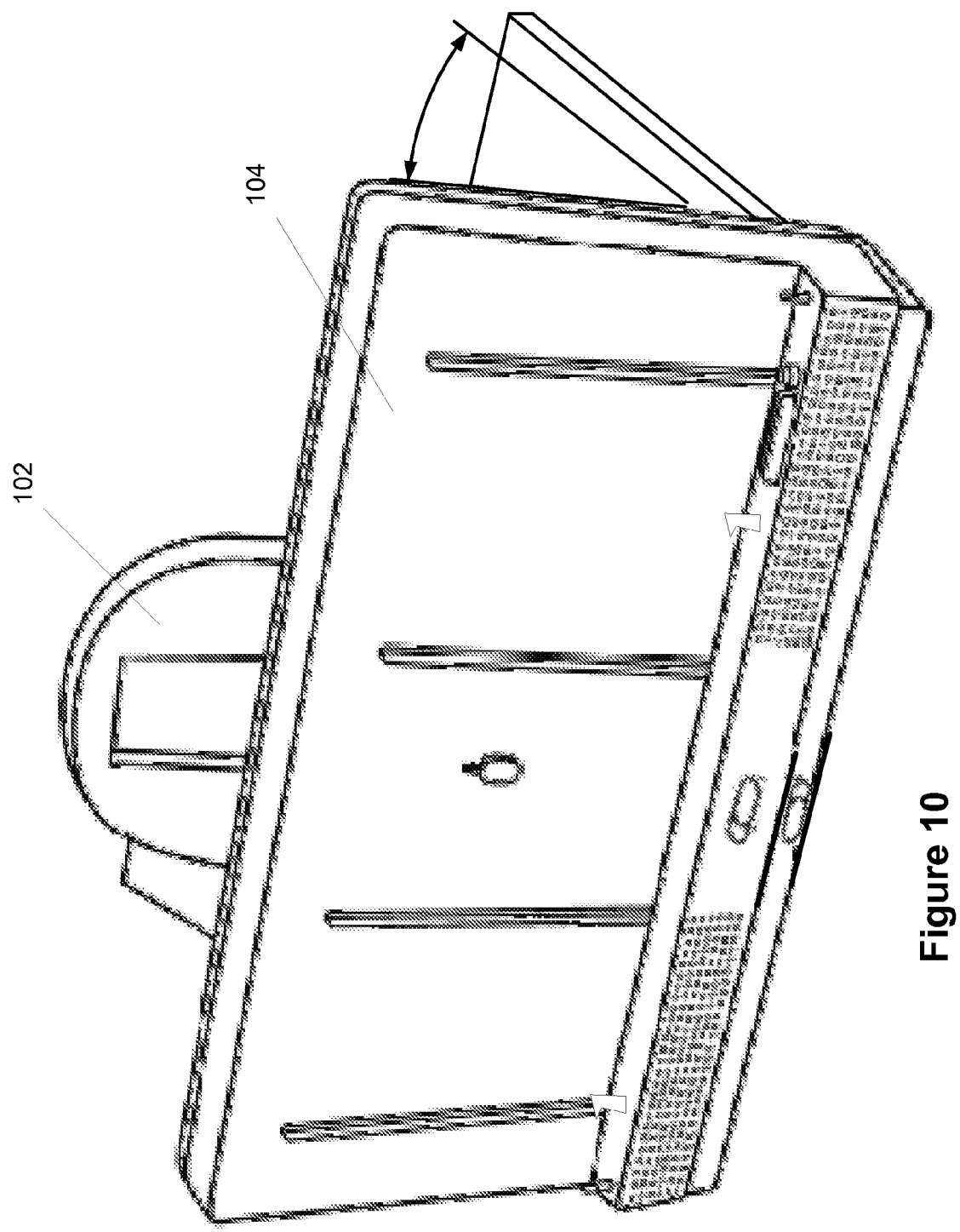
FIG. 10 shows the media slice and the PC stand of FIG. 1 connected to each other without being connected to a PC.

PC stand 102 may act as docking station to provide expanded functionality to PC 106 while in a desktop mode, such as connecting it to a full-sized keyboard, an external monitor, a mouse, etc. (not shown). Further, the PC stand may provide minimal expanded functionality, such as a wired power supply, or provide no expanded electronic functionality at all. The stand may omit connector 816 if it does not provide expanded electronic functionality therewith. Further, as shown in FIGS. 9 and 10, media slice 104 may be connected to PC stand 102 along with PC 106 (see FIG. 2), or it may be connected to the PC stand without the PC (see FIG. 10). Further, the PC may be directly connected to the PC stand in a conventional docking station configuration (see FIG. 9). As such, a user may add or exclude the media slice in connections with the PC stand depending on the functionality provided by the stand alone and the desirability of the additional functionality provided by the media slice.

Figure 11:
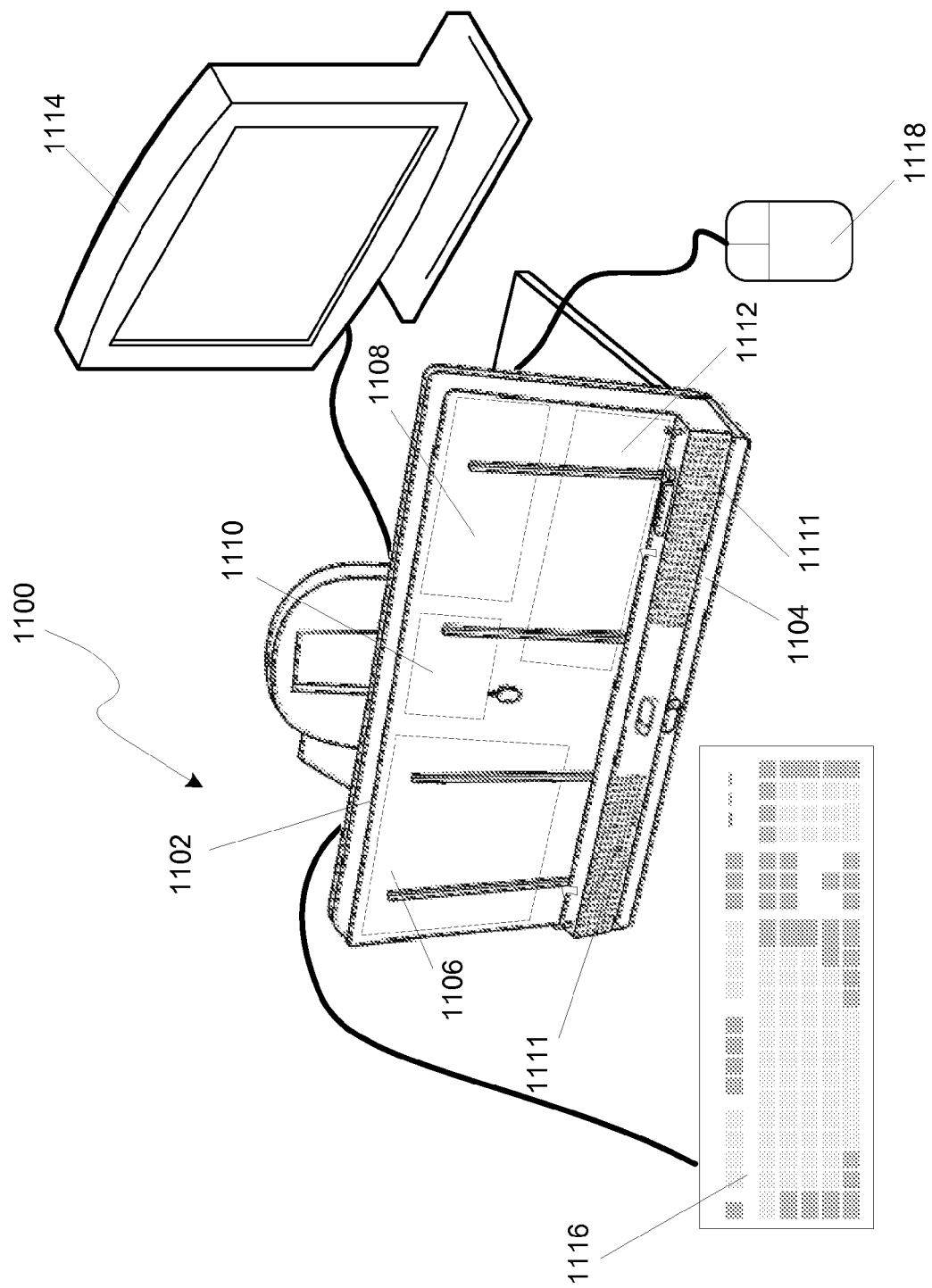
FIG. 11 shows a media slice and a PC stand in a functional mode apart from a computing device according to another embodiment of the invention.

In an optional embodiment shown in FIG. 11, an expansion system 1100 includes a media slice 1102 connected with a desktop stand 1104 to provide functionality without a separate computing device being connected thereto. In the example shown, the media slice includes a DVD drive 1106, a processor 1108, memory 1110, speakers 1111 and a graphics card 11 12. Connected to the media slice is a monitor 1114, a keyboard 1116 and a mouse 1118. In operation, the processor processes instructions stored in memory 1110, which may include read only memory (ROM) for providing DVD functionality instructions to the device. The keyboard and mouse permit a user to operate the DVD player in the absence of another computing device. When connected to a personal computer or other computing device, the media slice may add DVD player functionality to the computing device, and the PC stand may act as docking station for interfacing with desktop peripheral devices, such as keyboard 1116 and monitor 1114.

With the advent of high-speed bus connections, such as PCI express, media slice 1102 may operate as an independent computing device in a further embodiment, which is also illustrated by FIG. 11. For example, expansion system 1100 may be configured to operate as a low functionality desktop computer in the absence of a personal computer connected thereto. When the personal computer is connected therewith, such as PC 106, the system may provide a desktop computer with a higher level of functionality than that of the PC alone. High-speed connections, such as PCI express, can permit the additional PC to cooperate with the computing functionality of the media slice to enhance the computing capabilities of the PC alone. For instance, processor 1108 of the media slice may act as a second processor along with the additional PC to provide a dual processor device. In another example, media slice 1402 and its processing functionality may be used by the PC for secondary processing, such as to provide secondary video processing for displaying high-quality graphics or to expand the PC to operate as a computer-aided drafting (CAD) station.

Figure 12:
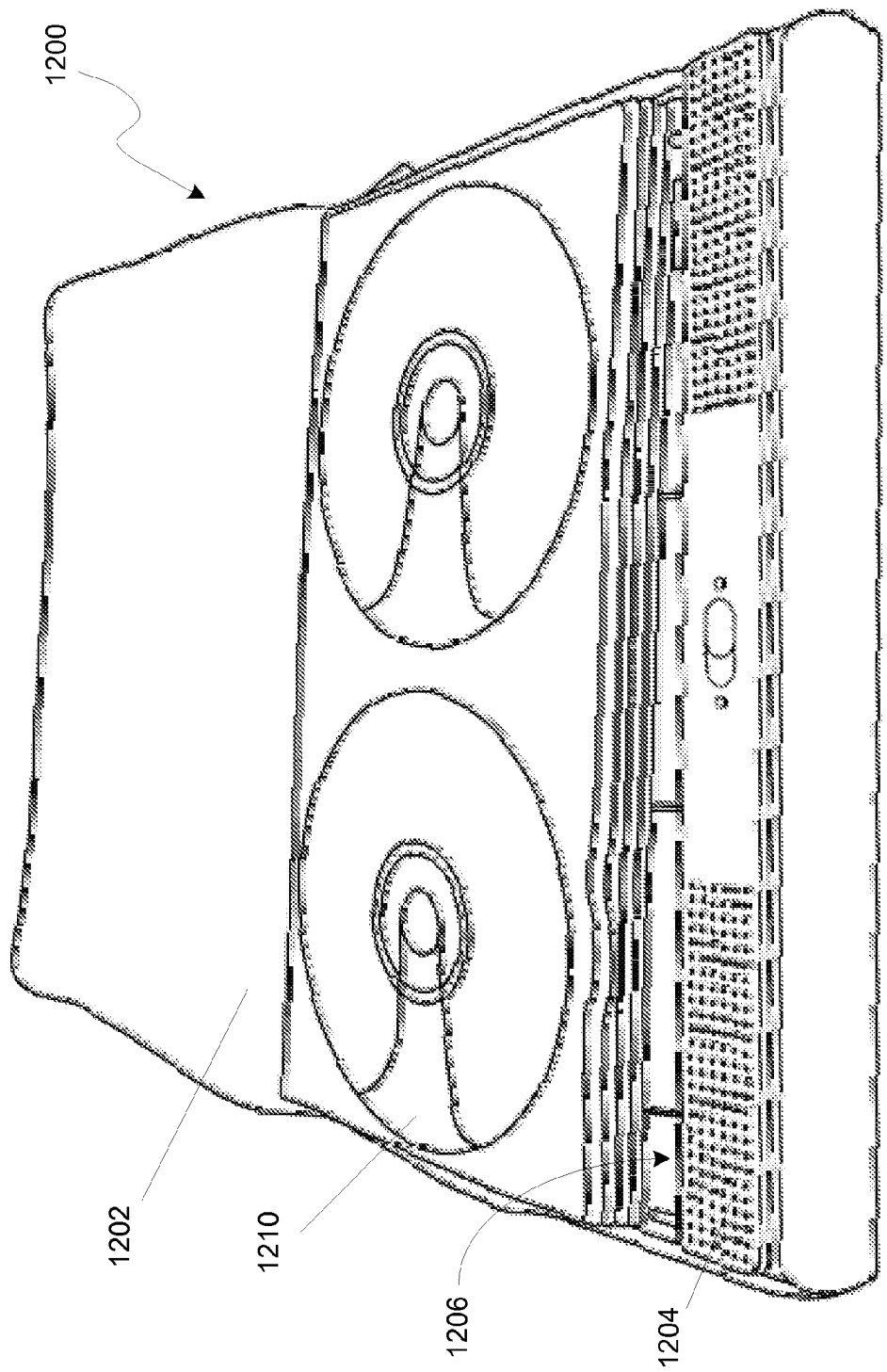
FIG. 12 shows a media slice carrying case according to another embodiment of the invention.

Referring now to FIG. 12, a media slice carrying system 1200 is generally shown. The carrying system includes a carrying case 1202, a media slice 1204, and media storage sleeves 1206. As shown, the recess 1208 in the media slice for receiving a PC nests well with stacks of CDs, DVDs or other media 1210 stored therein. As such, carrying case 1202 can carry the media slice and store a plurality of media disks in a single, compact unit that is easy for a user to carry along with a PC.

Aspects of the present invention have been described in terms of illustrative embodiments thereof. Numerous other embodiments, modifications and variations within the scope and spirit of the appended claims will occur to persons of ordinary skill in the art from a review of this disclosure. In particular, it is understood that aspects of the invention may practiced with a large variety of computing devices, including personal computers, mobile devices, PDAs, and mobile terminals. Further, it is understood that aspects of the invention may be used with expansion devices, peripheral devices, PC stands, docking stations, port replicators and computing devices, either alone, in combination, and/or as part of system.

We claim:

1. A media slice for a tablet PC, the media slice comprising:
   an L-shaped body having a first leg portion adapted to overlie a first side of the tablet PC and a second leg adapted to overlie a second side of the tablet PC;
   a media player;
   an audio speaker in communication with the media player;
   a first connector configured to connect with an expansion connector of the tablet PC and to permit the tablet PC to interact with the media player; and
   a second connector configured to replicate the expansion connector of the tablet PC, the second connector electrically connected with the first connector to enable an expansion device connected to the second connector to interface with the tablet PC while the tablet PC is connected to the first connector;
   wherein the second leg is configured to mate with a computer stand.

2. An expansion unit for providing expanded functionality to a tablet PC while bridging a connection from the tablet PC to a tablet PC stand, the expansion unit comprising:
   a first peripheral device providing expanded functionality to the tablet PC when electrically connected to the tablet PC;
   a first connector permitting the tablet PC to interface with the first peripheral device when the first connector is electrically connected to the tablet PC;
   a second connector electrically connected to the first connector and permitting the tablet PC to interface with the tablet PC stand via the first and second connectors when the second connector is electrically connected to the tablet PC stand;
   wherein the expansion unit is configured to be disposed between the tablet PC and the tablet PC stand when the first connector is electrically connected to the tablet PC and the second connector is electrically connected to the tablet PC stand;
   wherein the expansion unit has an L-shaped cross section comprising a first leg and a second leg.

3. The expansion unit of claim 2 wherein said first leg is configured to be disposed between a first portion of the tablet PC and a first portion of the tablet PC stand and wherein the second leg is configured to be disposed between a second portion of the tablet PC and a second portion of the tablet PC stand.

4. The expansion unit of claim 3 including at least one speaker on said second leg.

5. A media slice for a tablet PC, the media slice comprising:
   an L-shaped body having a first leg portion adapted to overlie a first side of the tablet PC and a second leg adapted to overlie a second side of the tablet PC;
   a media player;
   an audio speaker in communication with the media player;

a first connector configured to connect with an expansion connector of the tablet PC and to permit the tablet PC to interact with the media player; and a second connector configured to replicate the expansion connector of the tablet PC, the second connector electrically connected with the first connector to enable an expansion device connected to the second connector to interface with the tablet PC while the tablet PC is connected to the first connector;

wherein the second leg is configured to mate with a computer stand, and wherein said first connector is located on a first side of said second leg and said second connector is located on a second side of said second leg opposite from said first side.

* * * * *